Patented June 24, 1930

1,765,809

UNITED STATES PATENT OFFICE

FREDERICK W. VOGEL, OF BERLIN, NEW HAMPSHIRE, ASSIGNOR TO BROWN COMPANY, OF BERLIN, NEW HAMPSHIRE, A CORPORATION OF MAINE

PROCESS OF MAKING CARBON BISULPHIDE

No Drawing. Application filed December 22, 1924. Serial No. 757,369.

This invention has for its object certain improvements in the process of making carbon bisulphide whereby certain economies may be effected and losses in sulphur and carbon bisulphide prevented.

According to recent practice, carbon bisulphide is produced by heating a carbonaceous material such as wood charcoal to an elevated temperature approximating 1000° C. in an electric furnace and passing sulphur vapor through the charge of carbonaceous material, and then condensing the resulting carbon bisulphide by direct contact with water in an "open" condenser and thereby separating it from the other products of the reaction. With this method of making carbon bisulphide, a substantial portion of the original sulphur is lost in the form of uncondensable gases formed by the reaction of sulphur with moisture, tar, wood, etc., left in the incompletely calcined charcoal, of which hydrogen sulphide is the chief constituent. In the condenser a portion of the hydrogen sulphide dissolves in the water, but, if sufficient water is employed to effect the complete dissolving of all of the hydrogen sulphide, a large portion of the carbon bisulphide is also lost by solution. Again, unless in the condenser there is employed very cold water or refrigerated brine, any uncondensed gas carries out with it relatively large quantities of carbon bisulphide as a saturated vapor. For example at 0° C. each pound of $H_2S$ may carry with it 0.5 pound of $CS_2$; at 10° C., 0.85 pound of $CS_2$; at 20° C., 1.55 pounds of $CS_2$; and at 30° C., 3.35 pounds of $CS_2$.

The present invention comprises a process in which a larger yield of carbon bisulphide is obtained, by removing the hydrogen sulphide from the mixed gases and vapors delivered from the furnace, and thereby enabling the condensation and recovery of that carbon bisulphide which would otherwise be carried off by the hydrogen sulphide.

The present invention further comprises the removal of the hydrogen sulphide at a point between the furnace and the condenser by reaction therewith of gaseous sulphur dioxide to cause its oxidation to sulphur; and also comprises the recovery of the sulphur resulting from the reaction of the sulphur dioxide and the hydrogen sulphide. The $SO_2$ is preferably introduced under slight positive pressure into a cooling jacketed vapor conduit leading from the furnace to the condenser. The conduit is cooled to a temperature of, say, 120° to 150° C. in any suitable manner by a cooling medium, such as steam, circulated through its jacket. This conduit may with convenience be downwardly inclined and is provided at its lower end with a trap to receive the molten fluid sulphur which is formed therein. On the introduction of the sulphur dioxide the following reaction takes place: $4H_2S+2SO_2=3S_2+4H_2O$. The sulphur which results from this reaction condenses in the vapor conduit at the moderate temperatures there prevailing which are above its melting point (and above the boiling point of carbon bisulphide), so that it flows in liquid form down the vapor conduit to a trapped pipe by which it is conducted to a suitable receptacle and recovered for reuse in the production of the carbon bisulphide. The water vapor, which also results from the reaction, does not react further with sulphur or carbon bisulphide at the moderate temperature in the vapor conduit and is cooled and condensed in the condenser together with carbon bisulphide which is thereby separated from the other products of the initial reaction between the sulphur and the heated carbonaceous material.

The condensed carbon bisulphide and the water pass together from the condenser to a settling tank, in which the carbon bisulphide, due to its greater density, sinks to the bottom. The accumulated carbon bisulphide is drawn from time to time from the bottom portion of the tank, being thereby separated from the water and recovered, and the water flows continuously from the upper portion or top of the tank.

By removing the hydrogen sulphide from the mixed vapors and gases, the volume of noncondensable gas is greatly diminished, and the loss of carbon bisulphide is materially minimized, and also the sulphur contained in the hydrogen sulphide is recovered. The proportionate flow of sulphur dioxide gas to the vapor conduit is controlled by testing the effluent gases for hydrogen sulphide, as by means of lead acetate paper which is blackened by hydrogen sulphide, and then increasing or diminishing the flow as may thus be shown to be required.

While I regard it as more desirable to withdraw the sulphur from the vapor conduit in which it is formed, it may of course be permitted to pass to the condenser, and, if desired, be recovered therefrom separately from the carbon bisulphide, as by distilling the carbon bisulphide therefrom.

What I claim is:

1. A process of recovering carbon bisulphide from the mixed vapors and gases containing hydrogen sulphide and arising from the reaction of sulphur and heated carbonaceous material, which comprises commingling sulphur dioxide gas with such mixed gases and vapors to undergo reaction with the hydrogen sulphide, cooling the resulting mixture and separating the condensed carbon bisulphide from the other products of the reactions.

2. A process of recovering carbon bisulphide from the mixed vapors and gases containing hydrogen sulphide and arising from the reaction of sulphur and heated carbonaceous material, which comprises commingling sulphur dioxide gas with such mixed gases and vapors to undergo reaction with the hydrogen sulphide, separating and recovering the free sulphur which condenses, and cooling the remaining vapors to a temperature below the boiling point of carbon bisulphide, and recovering the condensed carbon bisulphide.

3. A process of recovering carbon bisulphide from the mixed vapors and gases containing hydrogen sulphide and arising from the reaction of sulphur and heated carbonaceous material, which comprises commingling sulphur dioxide gas with such mixed gases and vapors to undergo reaction with the hydrogen sulphide, cooling the resulting mixture to a temperature above the melting point of sulphur and recovering the condensed sulphur, cooling the remaining vapor to a temperature below the boiling point of carbon bisulphide, and recovering the condensed carbon bisulphide.

4. A process of recovering from the hot mixed gases and vapors resulting from the production of carbon bisulphide, the sulphur present therein as hydrogen sulphide, which comprises commingling sulphur dioxide gas with such mixed gases and vapors thus effecting reaction with such hydrogen sulphide at a moderate temperature above the melting point of sulphur, condensing the sulphur resulting from such reaction to liquid form, and withdrawing the same from the remaining mixed vapors and gases.

5. A process of recovering carbon bisulphide from the mixed vapors and gases arising in its formation, which comprises oxidizing the hydrogen sulphide in such mixed vapors and gases to sulphur, removing the sulphur, and condensing the carbon bisulphide.

6. A process of recovering carbon bisulphide from the mixed vapors and gases arising in its formation, which comprises introducing $SO_2$ gas into such gases and vapors to oxidize the hydrogen sulphide present therein to sulphur at a temperature above the melting point of the sulphur, removing the sulphur, and condensing the carbon bisulphide.

7. In a process which involves the reaction of sulphur and carbonaceous material at elevated temperature to produce carbon bisulphide in the mixed gases and vapors arising from the reaction, those steps which comprise oxidizing the hydrogen sulphide content of such mixed gases and vapors to sulphur by commingling sulphur dioxide therewith, removing the sulphur, and recovering the carbon bisulphide.

8. A process of recovering carbon bisulphide from the mixed vapors and gases containing hydrogen sulphide arising from the reaction of sulphur and heated carbonaceous material, which comprises commingling sulphur dioxide gas with such gases and vapors to oxidize the hydrogen sulphide to sulphur, cooling the resulting mixture to a temperature of about 120° to 150° C., recovering the sulphur produced in liquid condition, cooling the remaining vapor to a temperature below the boiling point of carbon bisulphide, and recovering the condensed carbon bisulphide.

In testimony whereof I have affixed my signature.

FREDERICK W. VOGEL.